(12) United States Patent
Campbell (10) Patent No.: US 12,527,417 B1
(45) Date of Patent: Jan. 20, 2026

(54) INFANT CAR SEAT

(71) Applicant: Shaqun Campbell, Brockton, MA (US)

(72) Inventor: Shaqun Campbell, Brockton, MA (US)

(*) Notice: Subject to any disclaimer, the term of this patent is extended or adjusted under 35 U.S.C. 154(b) by 188 days.

(21) Appl. No.: 18/488,134

(22) Filed: Oct. 17, 2023

(51) Int. Cl.
| | |
|---|---|
| *A47D 13/10* | (2006.01) |
| *A47D 9/02* | (2006.01) |
| *A47D 15/00* | (2006.01) |
| *A63G 31/16* | (2006.01) |

(52) U.S. Cl.
CPC .......... *A47D 13/10* (2013.01); *A47D 15/006* (2013.01)

(58) Field of Classification Search
CPC . A47D 9/02; A47D 9/04; A47D 9/057; A47D 13/10; A47D 15/006; B60N 2/2848; B62B 7/145; A63G 31/16
USPC ............. 5/107, 108, 109; 297/250.1, 256.16, 297/258.1, 260.2, 261.1; 280/30, 47.15, 280/47.25, 47.38, 647; 446/7
See application file for complete search history.

(56) References Cited

U.S. PATENT DOCUMENTS

| | | | | |
|---|---|---|---|---|
| 4,656,680 | A * | 4/1987 | Wilson ................... | A47D 9/016 5/107 |
| 4,685,688 | A * | 8/1987 | Edwards ............. | B60N 2/2848 D6/333 |
| 4,872,693 | A * | 10/1989 | Kennel ................ | B60N 2/2848 280/47.38 |
| 4,902,026 | A * | 2/1990 | Maldonado .......... | B60N 2/2848 280/30 |
| 4,989,888 | A * | 2/1991 | Qureshi ................. | B60N 2/286 280/30 |
| 5,022,669 | A * | 6/1991 | Johnson ............... | B60N 2/2806 280/47.38 |
| 5,711,045 | A * | 1/1998 | Caster .................... | A47D 13/10 5/108 |
| D417,568 | S * | 12/1999 | Pike .............................. | D6/333 |
| 6,519,792 | B2 * | 2/2003 | Chen ........................ | B62B 9/22 5/107 |
| 7,036,880 | B1 * | 5/2006 | Goodman .............. | A47D 13/10 297/256.16 |
| 7,073,859 | B1 * | 7/2006 | Wilson .................. | B60N 2/2863 297/256.13 |
| 7,100,976 | B1 * | 9/2006 | Desalve ............... | A47D 13/025 297/130 |
| 7,669,927 | B1 * | 3/2010 | Zaid ....................... | A47D 9/057 297/260.2 |
| 7,703,848 | B1 * | 4/2010 | Cochran ................ | A47D 9/057 297/256.16 |
| 7,814,587 | B2 * | 10/2010 | Thomas ................... | A47D 1/10 297/260.1 |

(Continued)

FOREIGN PATENT DOCUMENTS

WO     2009094013     7/2009

*Primary Examiner* — Alexander R Niconovich (74) *Attorney, Agent, or Firm* — Kyle A. Fletcher, Esq.

(57) ABSTRACT

The infant car seat includes a car seat and a motorized base. The infant car seat may be adapted to hold an infant outside of a vehicle while replicating the sensation of riding in the vehicle. The car seat may safely restrain the infant and may detachably couple to the top of the motorized base. The motorized base may include a pair of belts driven by at least one motor. Seat wheels in the car seat may be adapted to roll over the pair of belts while the car seat remains stationary such that the infant may experience constant gentle motion and vibration that replicates riding in the vehicle.

16 Claims, 7 Drawing Sheets

(56) References Cited

U.S. PATENT DOCUMENTS

| | | | | |
|---|---|---|---|---|
| 7,997,590 B2* | 8/2011 | Walters | ............... | B62B 3/10 |
| | | | | 280/47.38 |
| 8,007,043 B1* | 8/2011 | Vuong | ............. | B60N 2/2821 |
| | | | | 297/256.16 |
| 8,047,609 B2* | 11/2011 | Chen | ............... | A47D 13/105 |
| | | | | 297/260.1 |
| 8,047,888 B1* | 11/2011 | Seymore | ............. | A47D 9/016 |
| | | | | 472/36 |
| 8,544,941 B2* | 10/2013 | Coote | ............. | B62B 7/02 |
| | | | | 280/30 |
| 9,663,004 B2* | 5/2017 | Perrin | ............... | B60N 2/274 |
| 9,795,891 B1* | 10/2017 | Logan | ............... | A63G 31/16 |
| 10,470,585 B2* | 11/2019 | Robbins | ............... | A47D 1/10 |
| 10,675,548 B1* | 6/2020 | Colton | ............. | B60N 2/2845 |
| 11,267,376 B2* | 3/2022 | Churilla | ............. | B60N 2/2845 |
| 11,958,524 B1* | 4/2024 | Saucier | ............. | B60N 2/2848 |
| 2002/0113469 A1* | 8/2002 | Stern | ............. | A47D 1/10 |
| | | | | 297/256.16 |
| 2007/0129596 A1* | 6/2007 | Dickie | ............... | A47D 9/02 |
| | | | | 600/26 |
| 2010/0052373 A1* | 3/2010 | Kono | ............... | B62B 7/145 |
| | | | | 280/47.38 |
| 2012/0119457 A1* | 5/2012 | Williams | ............. | B62B 7/083 |
| | | | | 280/30 |
| 2014/0151969 A1* | 6/2014 | Kozinski | ............. | B60N 2/28 |
| | | | | 280/30 |
| 2015/0329017 A1* | 11/2015 | Kozinski | ............. | B62B 7/08 |
| | | | | 248/188 |
| 2021/0299398 A1* | 9/2021 | Chi | ............. | A47D 15/00 |

\* cited by examiner

INFANT CAR SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of infant seats and movement simulators, more specifically, an infant car seat that replicates the sensation of riding in a vehicle.

SUMMARY OF INVENTION

The infant car seat comprises a car seat and a motorized base. The infant car seat may be adapted to hold an infant outside of a vehicle while replicating the sensation of riding in the vehicle. The car seat may safely restrain the infant and may detachably couple to the top of the motorized base. The motorized base may comprise a pair of belts driven by at least one motor. Seat wheels in the car seat may be adapted to roll over the pair of belts while the car seat remains stationary such that the infant may experience constant gentle motion and vibration that replicates riding in the vehicle.

An object of the invention is to provide a car seat that may be operable to hold an infant that may detachably couple to a motorized base.

Another object of the invention is to provide a motorized base that may provide a pair of belts that may be driven to move by at least one motor A further object of the invention is to provide a plurality of pivoting wheel assemblies within the car seat such that seat wheels of the plurality of pivoting wheel assemblies may roll over the pair of belts while the car seat remains stationary.

Yet another object of the invention is to provide a power control to control the energization and de-energization of the at least one motor, the speed of the at least one motor, or both.

These together with additional objects, features and advantages of the infant car seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the infant car seat in detail, it is to be understood that the infant car seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the infant car seat.

It is therefore important that the claims be regarded as including such equivalent construction insofar as they do not depart from the spirit and scope of the infant car seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
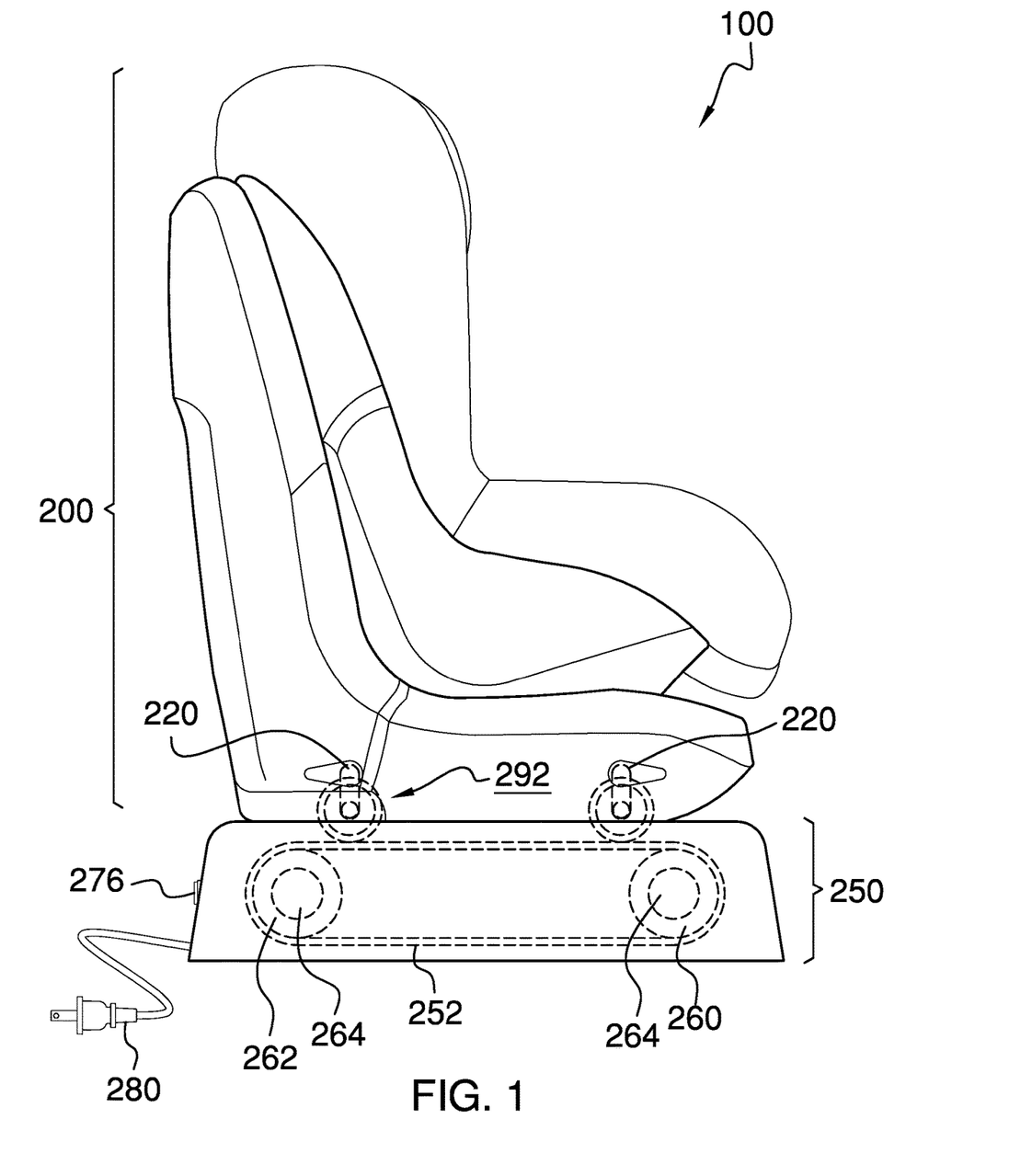
FIG. 1 is a side view of an embodiment of the disclosure.
Figure 2:
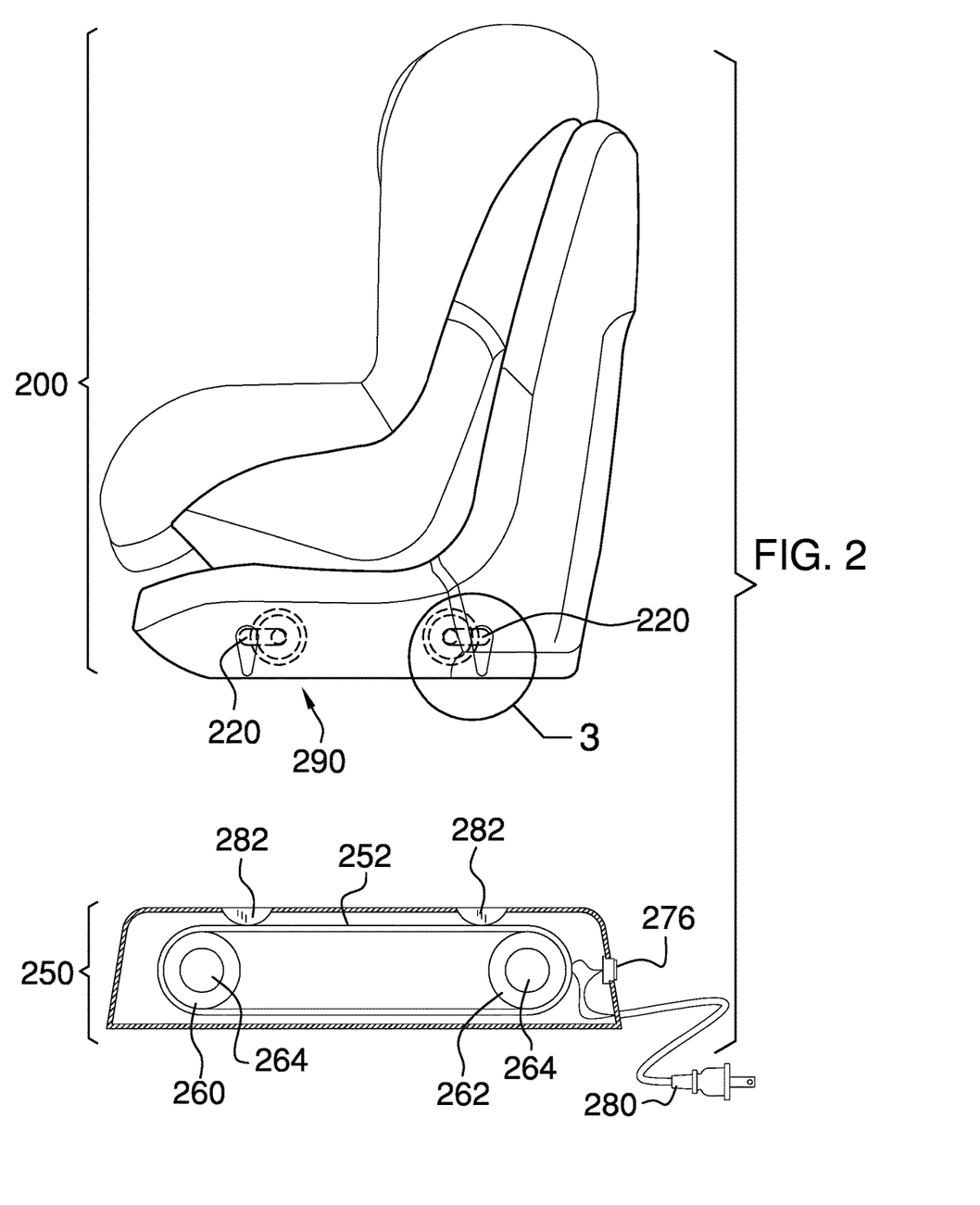
FIG. 2 is an exploded view of an embodiment of the disclosure.
Figure 3:
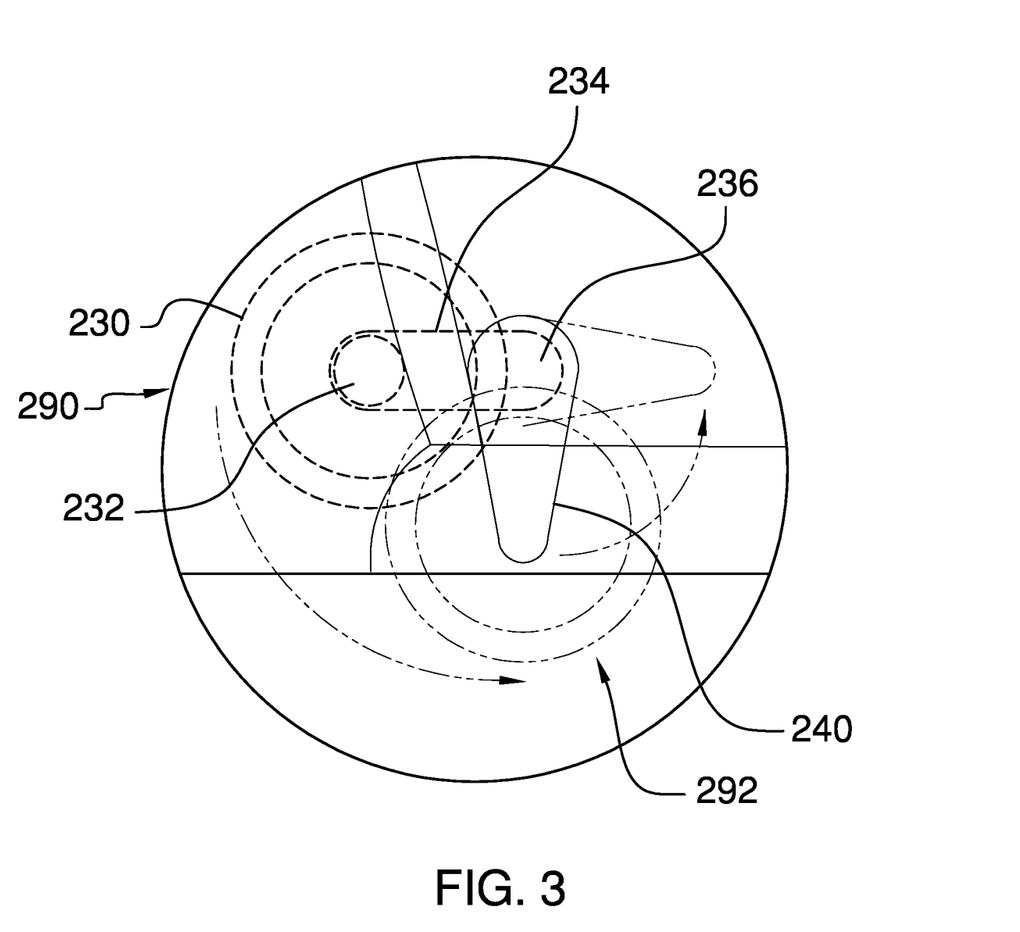
FIG. 3 is a detail view of an embodiment of the disclosure.
Figure 4:
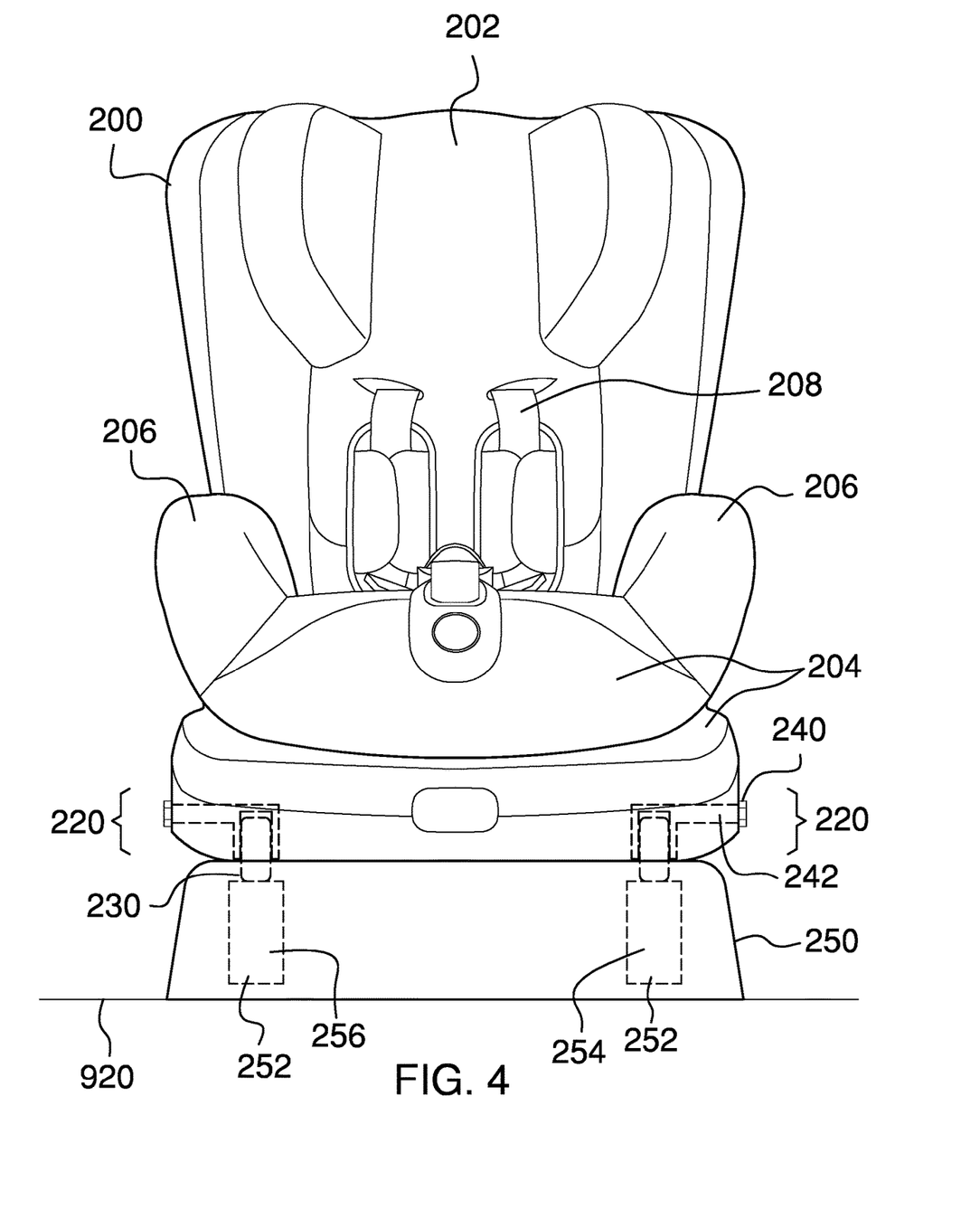
FIG. 4 is a front view of an embodiment of the disclosure.
Figure 5:
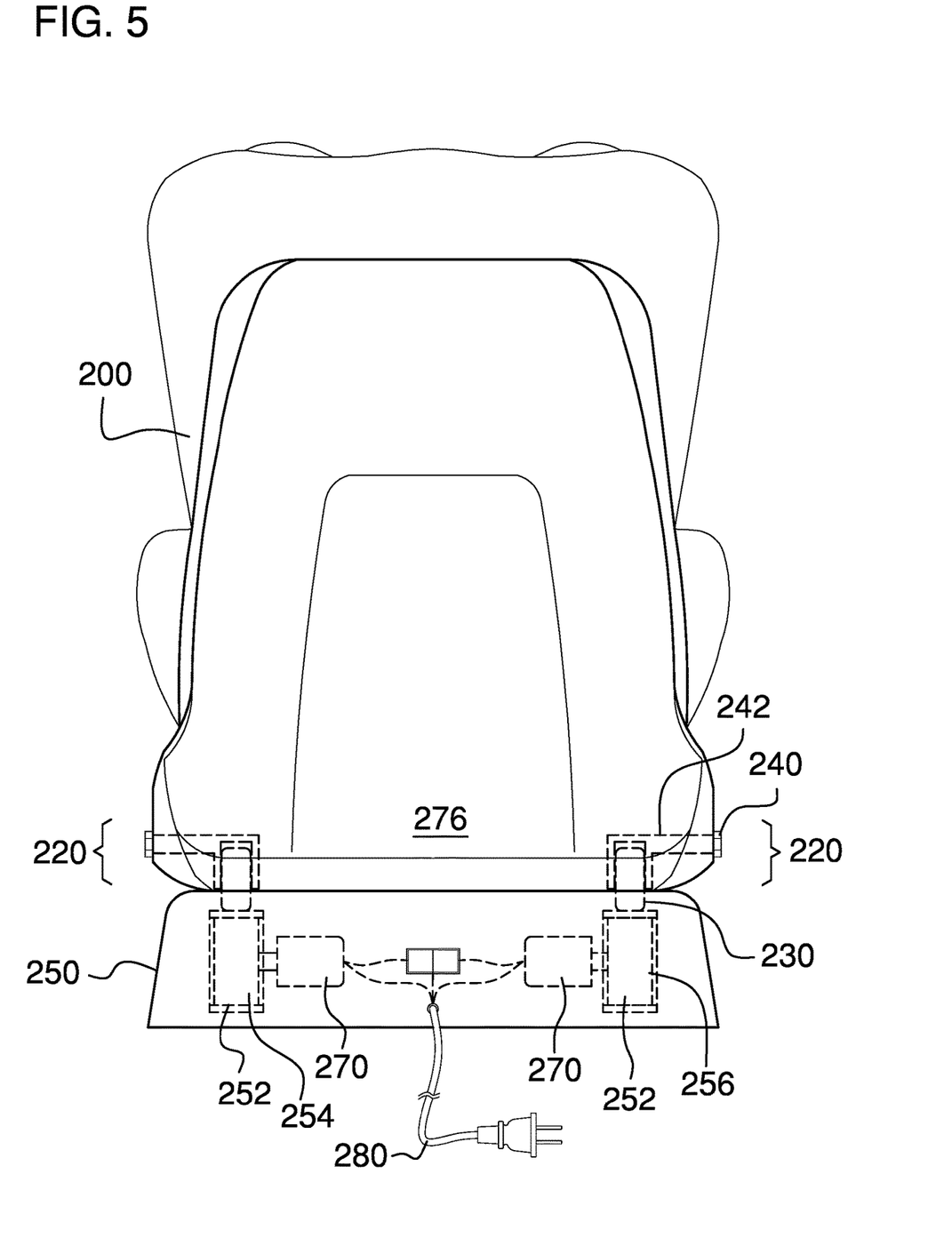
FIG. 5 is a rear view of an embodiment of the disclosure.
Figure 6:
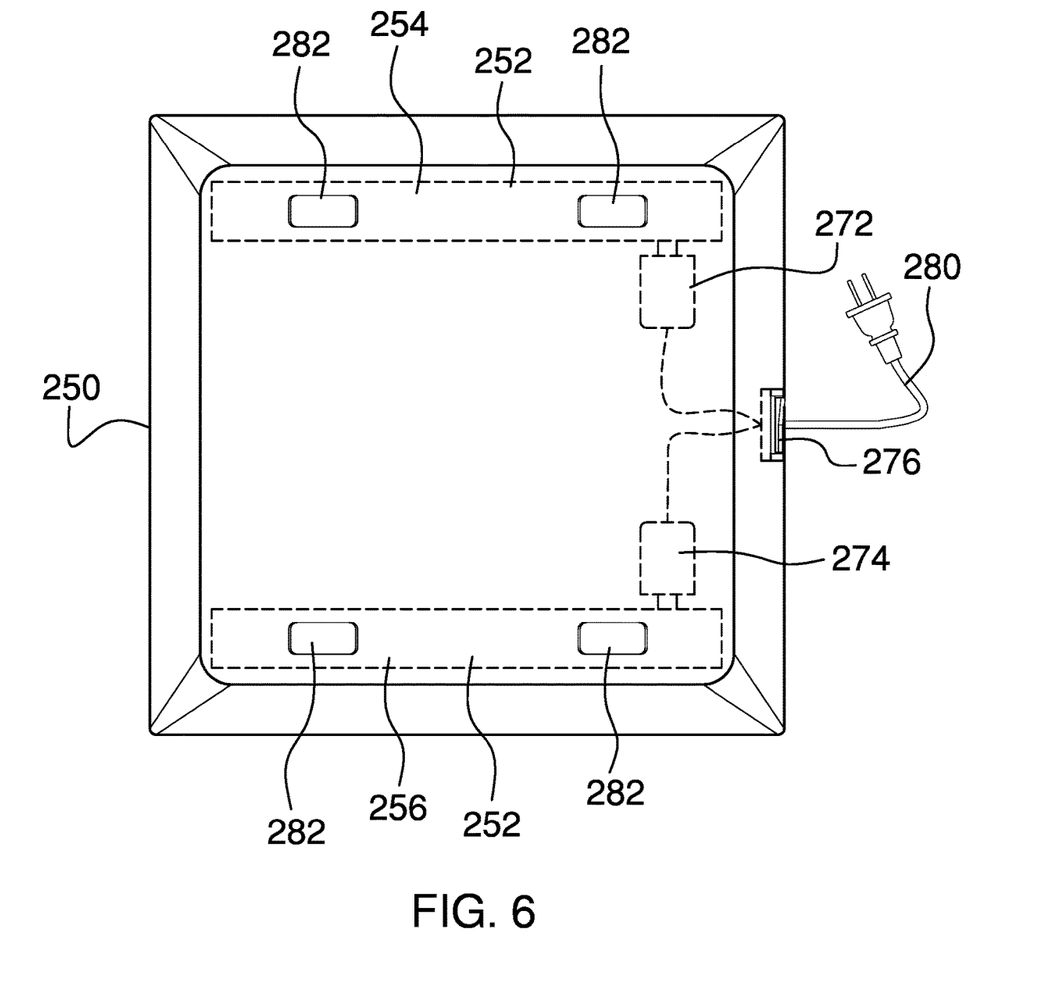
FIG. 6 is a top view of an embodiment of the disclosure, illustrating the motorized base.
Figure 7:
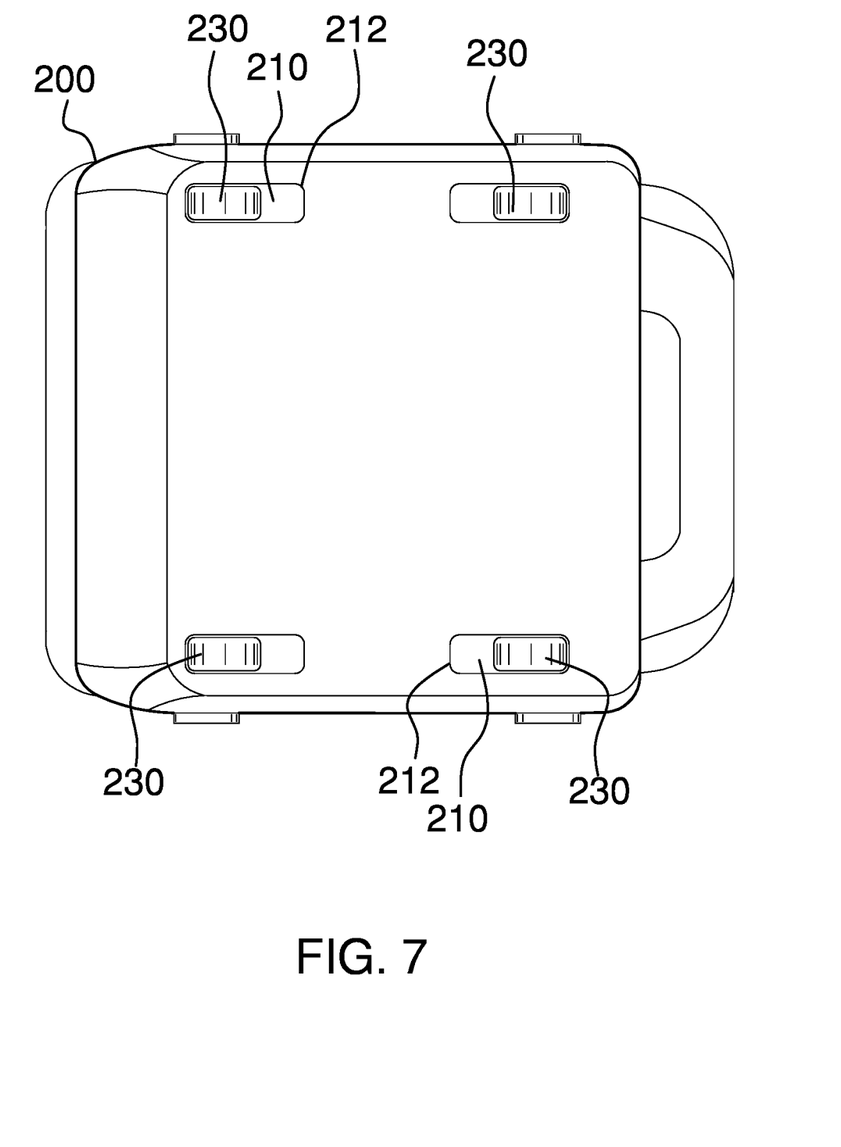
FIG. 7 is a bottom view of an embodiment of the disclosure illustrating the car seat.

Detailed reference will now be made to a first potential embodiment of the disclosure, which is illustrated in FIGS. 1 through 7.

The infant car seat 100 (hereinafter invention) comprises a car seat 200 and a motorized base 250. The invention 100 may be adapted to hold an infant 900 outside of a vehicle 910 while replicating the sensation of riding in the vehicle 910. The car seat 200 may safely restrain the infant 900 and may detachably couple to the top of the motorized base 250. The motorized base 250 may comprise a pair of belts 252 driven by at least one motor 270. Seat wheels 230 in the car seat 200 may be adapted to roll over the pair of belts 252 while the car seat 200 remains stationary such that the infant 900 may experience constant gentle motion and vibration that replicates riding in the vehicle 910.

The car seat 200 may comprise a seat back 202 coupled to a seat base 204. The car seat 200 may be adapted to support the infant 900 with the infant 900 sitting on the seat base 204 and leaning back against the seat back 202. The car seat 200 may comprise a pair of armrests 206. The seat back 202, the seat base 204, the pair of armrests 206, or any combination thereof may be cushioned for comfort. A harness 208 may be adapted to restrain the infant 900 within the car seat 200 in order to prevent the infant 900 from falling out of the car seat 200.

The car seat 200 may comprise a plurality of pivoting wheel assemblies 220. The plurality of pivoting wheel assemblies 220 may pivot between a wheel extended position 292 that exposes the seat wheels 230 outside of the car seat 200 and a wheel retracted position 290 that retracts the seat wheels 230 into the car seat 200. The plurality of pivoting wheel assemblies 220 may be located within a plurality of wheel wells 210 comprising seat wheel apertures 212 such that the seat wheels 230 may extend through the seat wheel apertures 212 located on the bottom of the car seat 200 when the seat wheels 230 are extended.

In a preferred embodiment, there may be four pivoting wheel assemblies.

An individual pivoting wheel assembly may comprise the seat wheel 230, a wheel arm 234, a wheel hinge 236, and a locking lever 240. The individual pivoting wheel assembly may pivot at the wheel hinge 236. The seat wheel 230 may be coupled to the wheel hinge 236 via the wheel arm 234 such that the seat wheel 230 extends out of the car seat 200 in the wheel extended position 292 of the individual pivoting wheel assembly and pivots to a position within the car seat 200 in the wheel retracted position 290 of the individual pivoting wheel assembly.

In the wheel extended position 292, the seat wheel 230 may contact an individual belt selected from the pair of belts 252 and may roll on the individual belt by rotating around an axle 232. In the wheel retracted position 290, the seat wheel 230 may be positioned inside of the car seat 200 such that the lowest part of the seat wheel 230 is above the lowest part of the car seat 200. The bottom of the car seat 200 may therefore rest stationary upon the seat base 204.

The locking lever 240 may be accessible on a side of the car seat 200. The locking lever 240 may be adapted for a user 950 to grasp while moving the individual pivoting wheel assembly between the wheel extended position 292 and the wheel retracted position 290. The locking lever 240 may be coupled to the wheel hinge 236 via a locking lever extension 242.

The bottom of the motorized base 250 may be placed on a supporting surface 920 and the car seat 200 may be placed on top of the motorized base 250. The pair of belts 252, comprising a left belt 254 and a right belt 256, may be located within the seat base 204. The left belt 254 and the right belt 256 may be oriented front to rear within the seat base 204. The pair of belts 252 may be accessible for the seat wheels 230 to contact via a plurality of base wheel apertures 282.

The individual belt selected from the left belt 254 and the right belt 256 may form a closed loop around a front drive wheel 260 at the front of the seat base 204 and a rear drive wheel 262 at the rear of the seat base 204. An individual drive wheel selected from the front drive wheel 260 and the rear drive wheel 262 may rotate around a drive wheel axle 264. In some embodiments, the drive wheel axle 264 may span the seat base 204 laterally such that a left side drive wheel and a right side drive wheel rotate around a single drive wheel axle.

The at least one motor 270 may be coupled to the drive wheel axle 264 to turn the pair of belts 252. The at least one motor 270 may convert electrical energy into rotational motion of the drive wheel axle 264. In some embodiments, a left motor 272 may move the left belt 254 and a right motor 274 may move the right belt 256.

The at least one motor 270 may be energized from a power cord 280. A power control 276 may be adapted for the user 950 to control the at least one motor 270. An ON position of the power control 276 may energize the at least one motor 270 and an OFF position of the power control 276 may de-energize the at least one motor 270. In some embodiments, the power control 276 may provide multiple ON positions such that the speed of the pair of belts 252 may be controlled.

The car seat 200 may be retained on the seat base 204 by the seat wheels 230 of the car seat 200 restrained by the plurality of base wheel apertures 282 of the seat base 204, by straps, by latches, by clips, by braces, or any combination thereof.

In use, the seat base 204 may be placed onto a supporting surface 920 and the car seat 200 may be placed onto the seat base 204. The infant 900 may be placed into the car seat 200 and the harness 208 may be fastened to safely restrain the infant 900. The plurality of pivoting wheel assemblies 220 may be pivoted to the wheel extended position 292 using the locking lever 240 and the at least one motor 270 may be energized using the power control 276 to start the pair of belts 252 moving.

With the pair of belts 252 moving, the infant 900 may experience constant gentle motion and vibration that replicates riding in a vehicle 910. The at least one motor 270 may be de-energized using the power control 276 and the car seat 200 may be moved to a different location that is away from the seat base 204. The plurality of pivoting wheel assemblies 220 may be pivoted to the wheel retracted position 290 so that the car seat 200 may sit level.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, an "axle" may be a cylindrical shaft or rod that is inserted through the center of an object such that the center axis of the object and the center axis of the axle are aligned and the object can rotate using the axle as an axis of rotation.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem. "De-energize" and/or "de-energization" may refer to the removal of the electrical potential.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "harness" may be an apparatus comprising a plurality of straps and one or more fasteners that is used to fasten or anchor a first person or first object to a second object. The phrase "N point harness" may refer to the installation of the harness wherein the harness has N anchor points. As a non-limiting example, a 2 point harness has two anchor points while a 5 point harness has 5 anchor points.

As used in this disclosure, a "hinge" may be a device that permits the turning, rotating, or pivoting of a first object relative to a second object.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "motor" may refer to a device that transforms energy from an external power source into mechanical energy.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, a "supporting surface" may be a horizontal surface upon which an object is placed. Within this disclosure, it is assumed that the object is placed on the supporting surface in an orientation that is appropriate for the normal or anticipated use of the object.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An infant car seat comprising:
   a car seat and a motorized base;
   wherein the infant car seat is adapted to hold an infant outside of a vehicle while replicating a sensation of riding in the vehicle;
   wherein the car seat is adapted to restrain the infant;
   wherein the car seat comprises a seat base that detachably couples to a top of the motorized base;
   wherein the motorized base comprises a pair of belts driven by at least one motor;
   wherein seat wheels in the car seat are adapted to roll over the pair of belts while the car seat remains stationary such that the infant experiences constant motion and vibration that replicates riding in the vehicle;
   wherein the car seat comprises a plurality of pivoting wheel assemblies;
   wherein the plurality of pivoting wheel assemblies pivot between a wheel extended position that exposes the seat wheels outside of the car seat and a wheel retracted position that retracts the seat wheels into the car seat;
   wherein an individual pivoting wheel assembly comprises the seat wheel, a wheel arm, a wheel hinge, and a locking lever;
   wherein the individual pivoting wheel assembly pivots at the wheel hinge;
   wherein in the wheel extended position, the seat wheel contacts an individual belt selected from the pair of belts and rolls on the individual belt by rotating around an axle wherein a bottom of the car seat rests stationary upon the seat base; and
   wherein both the car seat and the seat base are placed onto the top of the motorized base.

2. The infant car seat according to claim 1
   wherein the car seat comprises a seat back coupled to the seat base;
   wherein the car seat is adapted to support the infant with the infant sitting on the seat base and leaning back against the seat back.

3. The infant car seat according to claim 2
   wherein the car seat comprises a pair of armrests.

4. The infant car seat according to claim 3
   wherein the seat back, the seat base, the pair of armrests, or any combination thereof are cushioned;
   wherein a harness is adapted to restrain the infant within the car seat in order to prevent the infant from falling out of the car seat.

5. The infant car seat according to claim 4
   wherein the plurality of pivoting wheel assemblies are located within a plurality of wheel wells comprising seat wheel apertures such that the seat wheels extend through the seat wheel apertures located on a bottom of the car seat when the seat wheels are extended.

6. The infant car seat according to claim 5
   wherein there are four pivoting wheel assemblies.

7. The infant car seat according to claim 5
   wherein the seat wheel is coupled to the wheel hinge via the wheel arm such that the seat wheel extends out of the car seat in the wheel extended position of the individual pivoting wheel assembly and pivots to a position within the car seat in the wheel retracted position of the individual pivoting wheel assembly.

8. The infant car seat according to claim 7
   wherein in the wheel retracted position, the seat wheel is positioned inside of the car seat such that a lowest part of the seat wheel is above a lowest part of the car seat.

9. The infant car seat according to claim 8
   wherein the locking lever is accessible on a side of the car seat;
   wherein the locking lever is adapted for a user to grasp while moving the individual pivoting wheel assembly between the wheel extended position and the wheel retracted position;

wherein the locking lever is coupled to the wheel hinge via a locking lever extension.

10. The infant car seat according to claim 9 wherein a bottom of the motorized base is placed on a supporting surface and the car seat is placed on top of the motorized base;

wherein the pair of belts, comprising a left belt and a right belt, are located within the seat base;

wherein the left belt and the right belt are oriented front to rear within the seat base;

wherein the pair of belts is accessible for the seat wheels to contact via a plurality of base wheel apertures.

11. The infant car seat according to claim 10 wherein the individual belt selected from the left belt and the right belt form a closed loop around a front drive wheel at the front of the seat base and a rear drive wheel at the rear of the seat base;

wherein an individual drive wheel selected from the front drive wheel and and the rear drive wheel rotates around a drive wheel axle.

12. The infant car seat according to claim 11 wherein the drive wheel axle spans the seat base laterally such that a left side drive wheel and a right side drive wheel rotate around a single drive wheel axle.

13. The infant car seat according to claim 11 wherein the at least one motor is coupled to the drive wheel axle to turn the pair of belts;

wherein the at least one motor converts electrical energy into rotational motion of the drive wheel axle.

14. The infant car seat according to claim 11 wherein a left motor moves the left belt and a right motor moves the right belt.

15. The infant car seat according to claim 14 wherein the at least one motor is energized from a power cord;

wherein a power control is adapted for the user to control the at least one motor;

wherein an ON position of the power control energizes the at least one motor and an OFF position of the power control de-energizes the at least one motor.

16. The infant car seat according to claim 15 wherein the power control provides multiple ON positions such that a speed of the pair of belts is controllable.

* * * * *